(12) United States Patent
Meredith et al.

(10) Patent No.: US 12,464,070 B2
(45) Date of Patent: Nov. 4, 2025

(54) METHOD AND APPARATUS FOR DETECTING NUISANCE TRAFFIC EVENTS BASED ON NETWORK AND WIRELESS PHONE NUMBER

(71) Applicants: AT&T Intellectual Property I, L.P., Atlanta, GA (US); AT&T Mobility II LLC, Atlanta, GA (US)

(72) Inventors: Sheldon Kent Meredith, Roswell, GA (US); Zachary Cleigh Meredith, Eagle River, AK (US); Howard L. Lang, Wayside, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 395 days.

(21) Appl. No.: 18/064,928

(22) Filed: Dec. 12, 2022

(65) Prior Publication Data

US 2024/0195909 A1 Jun. 13, 2024

(51) Int. Cl.
*H04W 8/20* (2009.01)
*H04M 3/22* (2006.01)

(52) U.S. Cl.
CPC .......... *H04M 3/2281* (2013.01); *H04W 8/20* (2013.01)

(58) Field of Classification Search
CPC .................................................. H04M 3/2281

USPC ......................................................... 455/415
See application file for complete search history.

(56) References Cited

U.S. PATENT DOCUMENTS

| | | | |
|---|---|---|---|
| 7,974,395 B2 | 7/2011 | Abramson | |
| 8,681,783 B2 | 3/2014 | Carney | |
| 9,060,057 B1 | 6/2015 | Danis | |
| 9,241,101 B2 | 1/2016 | Marino | |
| 10,951,775 B1 | 3/2021 | Okhrimenko | |
| 11,153,434 B2 | 10/2021 | Piscopo, Jr. | |
| 2020/0186642 A1* | 6/2020 | Kreiner | ......... H04L 65/65 |
| 2021/0368043 A1* | 11/2021 | de la Garza Villarreal | ......... H04L 65/1079 |

OTHER PUBLICATIONS

Sheldon Meredith et al., "Nuisance Traffic Event Detection," U.S. Appl. No. 17/745,813, filed May 16, 2022, 54 pages.

\* cited by examiner

*Primary Examiner* — Ahmad F. Matar
*Assistant Examiner* — Jirapon Tulop

(57) ABSTRACT

A processing system may determine a nuisance traffic event. The processing system may receive from a first entity a request to determine a status of a wireless user endpoint device associated with a wireless phone number, wherein the status comprises a determination as to a validity of a subject communication associated with the wireless phone number, perform a presence analysis of the wireless user endpoint device based on the wireless phone number, and respond to the request by providing an indication as to the validity of the subject communication associated with the wireless phone number back to the first entity.

20 Claims, 4 Drawing Sheets

METHOD AND APPARATUS FOR DETECTING NUISANCE TRAFFIC EVENTS BASED ON NETWORK AND WIRELESS PHONE NUMBER

The present disclosure relates generally to communication network operations, and more particularly to methods, computer-readable media, and apparatuses for detecting nuisance traffic events (NTEs).

BACKGROUND

A nuisance traffic event may comprise falsifying information in a manner to disguise a communication event as legitimate, or otherwise misleading a receiver of the NTE as to the NTE's origination, such as a spoofed Caller ID, a robocall or robotext, etc. In other words, a nuisance traffic event (NTE) can be a communication event that utilizes false information to increase a likelihood of reaching an intended receiver. Persistent robocalls, nefarious directed marketing calls/texts pertaining to products or services, or other spam-type calls and texts, etc., can be typical examples of NTEs. Even with the enactment of various legislations to reduce NTEs, the proliferation of NTEs continues to occur at a very high rate. This can negatively impact a subscriber's experience. Thus, a communication service provider or carrier can add significant value to its communication network by improving the rejection and/or mitigation of NTEs. Namely, improved detection of NTEs can be a valuable differentiator between different carriers/providers of communications services.

SUMMARY

In one example, the present disclosure describes a method, computer-readable medium, and apparatus for determining a nuisance traffic event. The processing system may receive from a first entity a request to determine a status of a wireless user endpoint device associated with a wireless phone number, wherein the status comprises a determination as to a validity of a subject communication associated with the wireless phone number, perform a presence analysis of the wireless user endpoint device based on the wireless phone number, and respond to the request by providing an indication as to the validity of the subject communication associated with the wireless phone number back to the first entity.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
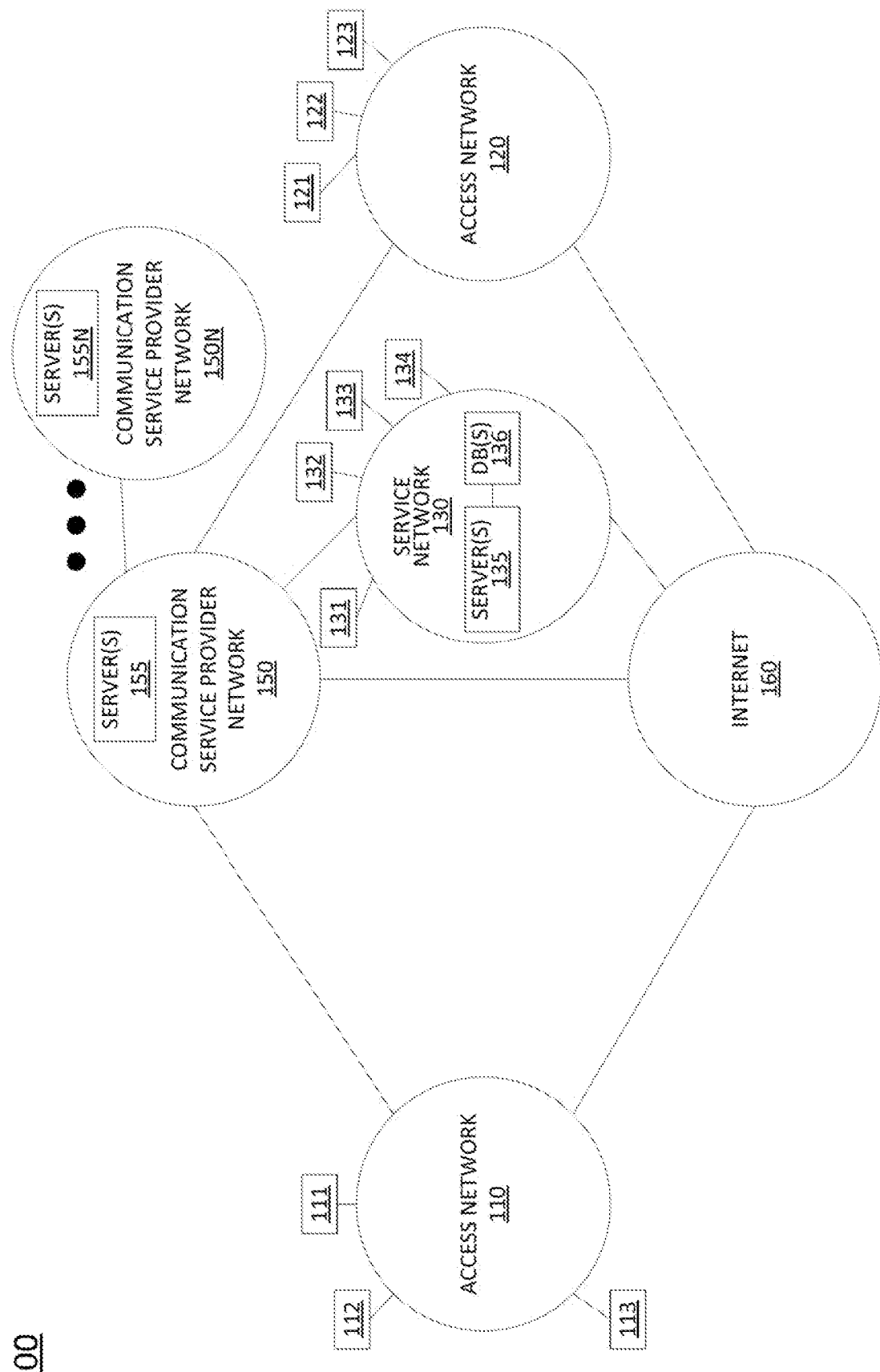
FIG. 1 illustrates one example of a system related to the present disclosure.

The present disclosure broadly discloses methods, non-transitory (i.e., tangible or physical) computer-readable storage media, and apparatuses for detecting nuisance traffic events. To illustrate, almost 90% of robocalls (a type of nuisance traffic event) arriving at a destination carrier's network or service provider network come from off-network. In other words, the robocalls originated from a network (e.g., network A) that is external to a destination carrier network or service provider network (e.g., network B). A robocall is a call that delivers a pre-recorded message through auto-dialing software that reaches millions of people every day. If you answer your phone and hear a recorded message instead of a real person speaking, you are likely listening to a robocall. Although some robocalls may provide useful information, such as appointment reminders or flight cancellations. Unfortunately, most robocalls are trying to market some products or services, and many of these robocalls may be associated with scams.

More importantly, nefarious robocalls are spoofing real phone numbers (e.g., wireless phone numbers of various wireless carriers) and it is often difficult to ascertain whether the incoming call connection request is legitimate or not. This spoofing is being perpetrated against all wireless carriers (broadly communication network service providers). Currently there is no reliable method being used to detect and block spoofed numbers coming from off-network. The term "wireless" is used herein synonymously as "mobile."

Within each wireless carrier network itself, methods do exist for allowing the carrier's own Home Subscriber Server (HSS)/Home Location Register (HLR) to determine whether its subscribers are currently off-network (e.g., roaming). If a spoofed robocall arrives using one of the carrier's own numbers from an off-network, but the device is not currently roaming, then the carrier may know there is a potential problem. However, this solution does not allow the carrier (e.g., carrier A) to detect those phone numbers from other wireless carriers (e.g., carriers B-Z) that are being spoofed. For instance, if a bad actor spoofs a phone number of carrier A and uses the spoofed phone number to call someone on carrier B's network, carrier B has no way of knowing if the phone number is legitimate or spoofed.

One potential solution to this problem is the use of roaming information of subscribers from multiple carriers to be shared in some way, e.g., reporting by each wireless carrier as to its roaming subscribers, e.g., responding directly to a query from another wireless carrier, preemptively providing information of all of its roaming subscribers to another wireless carrier, preemptively providing information of all of its roaming subscribers to a third party that is not a wireless carrier, and the like. Thus, if all wireless carriers are able to share the roaming status of their own devices with all other wireless carriers, then each carrier will possess the necessary information to defeat and block most all of the robocalls coming in from off-network.

For example, in one embodiment all wireless carriers can send real-time roaming status of its own roaming devices to a service provider that is distinct from all of the wireless carriers (e.g., a third party that is not a wireless carrier). In other words, this independent third party may provide an NTE detection service to one or more participating wireless carriers. For example, if such an NTE detection service learns from wireless carrier A which of its devices are roaming, then wireless carrier B can inspect a call request and compare if a wireless carrier A phone number arriving from off-network has a positive roaming status. If not, there is a conflict because a wireless carrier A's mobile device cannot be registered on wireless carrier A's network and another network both at the same time. In another example, assume that wireless carrier A, wireless carrier B and wireless carrier C share roaming status. If a call arrives at wireless carrier A's network from a non-carrier B network (e.g., wireless carrier C's network) using a wireless carrier B phone number, the detection service can inspect the roaming status indicator from wireless carrier B to detect if there is a problem. The wireless carrier B phone number cannot be registered to wireless carrier B's network and wireless carrier C's network at the same time. The detection service can independently perform these actions for each wireless carrier. Namely, this function can be performed for any wireless operator using the roaming information from any other wireless operator.

In a second embodiment, there is no need for the third party detection service. Instead, the method allows all wireless carriers to share subscriber roaming status information directly with each other (e.g., actively or passively). In this embodiment, each wireless carrier may inform other wireless carriers as to its current list of roaming numbers. For example, each wireless carrier may provide such a list on a periodic basis to another wireless carrier without the other wireless carrier requesting for the list (e.g., passively providing the list to another wireless carrier). In another example, each wireless carrier may request for such a list (or just one phone number) on an adhoc basis from another wireless carrier (e.g., actively requesting for the roaming information in real time of a particular wireless phone number).

However, it has been observed that subscribers are protective of their presence information. In other words, subscribers are sensitive as to their privacy as reflected in location information. Presence information, e.g., the subscribers' current location pertaining to which network a particular subscriber device is currently registered on can be considered to be sensitive information by the subscriber. In other words, although this presence information is necessary to provide an innate service (e.g., a carrier must know the relevant network that a subscriber device is currently registered in order to effectively forward a call to the subscriber), a subscriber may nevertheless be skeptical as to its use for other non-innate service functions. Namely, in certain scenarios a subscriber will be required to consent to the use of the subscriber's presence information in order to fulfill certain network service functions because such presence information is an inherent necessary component that must be used to deliver the network service functions, e.g., locating the user endpoint device to deliver a text, a voicemail, a call, a media stream, and the like. However, subscriber's presence information may be deemed optional in other "elective" network service functions (e.g., services that a subscriber may opt-into). Thus, in one embodiment, a subscriber has to affirmatively provide his or her consent as to the sharing of his or her roaming status for the purpose of being used in an NTE detection service.

In fact, when given a choice, a subscriber may decline his or her consent for all other non-innate service functions as to the sharing of roaming status information. For example, a subscriber may decline a blanket request for the sharing of his or her roaming status information. Namely, a subscriber may consent to a more focused request for the sharing of his or her roaming status information for a particular use case, e.g., as applied in an NTE detection service, in a fraud detection service, and the like. Thus, in one embodiment, the use of the subscriber roaming information is specifically limited in the application of subscriber roaming information in the context of the NTE detection service. In other words, when a wireless carrier makes a request for obtaining subscriber roaming information from another wireless carrier, the request would indicate the specific purpose of the request is related only to the use of the received subscriber roaming information in the context of the NTE detection service. Similarly, if the subscriber roaming information is provided passively, i.e., without a specific request being made by a wireless carrier, then the agreement among the participating wireless carriers for sharing such subscriber roaming information specifically constrains the use of received subscriber roaming information only in the context of the NTE detection service.

Alternatively, in one embodiment, the subscriber roaming information is not shared among the wireless carriers. In this embodiment, the requesting wireless carrier does not request for the subscriber's roaming status from another carrier. In contrast, the requesting wireless carrier provides a request to another wireless carrier and asks the other wireless carrier to confirm the validity of a particular call. For example, wireless carrier A receives a call terminating at wireless carrier A's network from a phone number known to be a wireless carrier B phone number coming from an originating network of wireless carrier C. Detecting that the call did not originate from wireless carrier B's network, wireless carrier A may then send a request to wireless carrier B to confirm whether the call is a valid call. In turn, wireless carrier B may consult its own HLR/HSS to determine whether the subscriber of wireless carrier B is currently roaming. If the subscriber is currently roaming, then there is a fairly high confidence that the call originating from wireless carrier C's network and terminating in wireless carrier A's network is potentially from the subscriber. In response to the request, wireless carrier B may respond to wireless carrier A that the call is a valid call from the subscriber.

In one embodiment, wireless carrier B may actually further determine whether the subscriber is currently registered with wireless carrier C's network before responding to wireless carrier A. This additional review or analysis will add higher confidence in its response to wireless carrier A. For example, if the subscriber of wireless carrier B is currently registered with wireless carrier D's network and not with wireless carrier C's network, then wireless carrier B may respond to wireless carrier A that the call is an invalid call from the subscriber. Although the subscriber is currently roaming, the subscriber is not roaming on wireless carrier C's network, thereby indicating that the call is suspect. Under this alternate embodiment, no subscriber roaming status information is actually shared among the wireless carriers. Thus, in this embodiment, the subscriber presence information is not shared while the subscriber is able to receive the benefits of the NTE detection service. In other words, if the subscriber's wireless phone number is being spoofed, e.g., for use in robocalls, then such activities can be quickly terminated at the carrier level, i.e., the calls are terminated without ever reaching the intended recipients. Furthermore, the subscriber may be notified that his or her wireless phone number may have been used in connection with an NTE. If the determination of an NTE is incorrect, the user may optionally provide feedback to the wireless carrier informing the wireless carrier that the previous determination of an NTE associated with the subscriber wireless phone number was incorrect. This will allow the wireless carrier to fine tune its NTE detection service in view of the user feedback.

Furthermore, since wireless carrier B merely responds to wireless carrier A that the call of interest is an invalid call or a valid call from the subscriber, wireless carrier A may not know the true reason behind carrier B's response. For example, the subscriber's account may be temporarily suspended (e.g., the subscriber requested a temporary suspension) or terminated (e.g., the subscriber canceled the line or the subscriber has failed to maintain the account) such that a call initiated by the subscriber is unlikely. Thus, in this embodiment, the NTE detection service can be provided to the subscriber without the subscriber's roaming status information being shared with another wireless carrier, thereby protecting the subscriber's privacy while providing a valuable service. These and other aspects of the present disclosure are discussed in greater detail below in connection with the examples of FIGS. 1-4.

To aid in understanding the present disclosure, FIG. 1 illustrates an example system 100 comprising a plurality of different networks in which examples of the present disclosure may operate. Communication service provider network 150 may comprise a core network with components for telephone services, Internet services, or television services (e.g., triple-play services, etc.) and/or media streaming service that are provided to customers (broadly "subscribers"), and to peer networks. In one example, each of the communication service provider networks 150-150n may combine core network components of a cellular network with components of a triple-play service network. For example, communication service provider network 150 may functionally comprise a fixed-mobile convergence (FMC) network, e.g., an IP Multimedia Subsystem (IMS) network. In addition, communication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VOIP) telephony services. Communication service provider network 150 may also further comprise a broadcast television network, e.g., a traditional cable provider network or an Internet Protocol Television (IPTV) network, as well as an Internet Service Provider (ISP) network. With respect to television service provider functions, communication service provider network 150 may include one or more television servers for the delivery of television content, e.g., a broadcast server, a cable head-end, a video-on-demand (VOD) server, a streaming server, and so forth. For example, communication service provider network 150 may comprise a video super hub office, a video hub office and/or a service office/central office.

In one example, each communication service provider network 150 may comprise a wireless network (e.g., a wireless carrier network) and may also include one or more servers 155-155n. In one example, the servers 155-155n may each comprise a computing device or system, such as computing system 400 depicted in FIG. 4, and may be configured to host one or more centralized and/or distributed system components. For example, a first system component may comprise a database of assigned telephone numbers, a second system component may comprise a database of basic customer account information for all or a portion of the customers/subscribers of the communication service provider network 150, a third system component may comprise a cellular network service home location register (HLR) and/or visitors location register (VLR), e.g., with current serving base station information of various subscribers, and so forth. Other system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, a presence system for tracking subscriber location information, and so forth. In addition, other system components may include, for example, a layer 3 router, a short message service (SMS) server, a voicemail server, a video-on-demand server, a server for network traffic analysis, a media streaming server, and so forth. It should be noted that in one example, a system component may be hosted on a single server, while in another example, a system component may be hosted on multiple servers in a same or in different data centers or the like, e.g., in a distributed manner. For ease of illustration, various components of communication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user devices (e.g., subscriber/customer devices) and/or one or more servers of one or more third parties, such as a credit bureau, a payment processing service (e.g., a credit card company), an email service provider, a third party for providing NTE detection services, and so on.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where communication service provider network 150 may provide service network 130 functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the communication service provider network 150. For example, the service network 130 may comprise one or more devices for providing services to subscribers, customers, and/or users. For example, communication service provider network 150 may provide a cloud storage service, web server hosting, and other services. As such, service network 130 may represent aspects of communication service provider network 150 where infrastructure for supporting such services may be deployed. In other words, service network 130 can be a part of communication service provider network 150 that is tasked with performing a particular service, e.g., an NTE detection service and so on.

In one example, the service network 130 links one or more devices 131-134 with each other and with Internet 160, communication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the communication service provider network 150, devices 131-134 of the service network 130 may comprise devices of network personnel, such as customer service agents, sales agents, marketing personnel, or other employees or representatives who are tasked with addressing customer-facing issues and/or personnel for network maintenance, network repair, construction planning, and so forth.

In the example of FIG. 1, service network 130 may include one or more servers 135 which may each comprise all or a portion of a computing device or processing system, such as computing system 400, and/or a hardware processor element 402 as described in connection with FIG. 4 below, specifically configured to perform various steps, functions, and/or operations for providing an NTE detection service, as described herein. For example, one of the server(s) 135, or a plurality of servers 135 collectively, may perform operations in connection with the example methods 200 and 300 of FIGS. 2 and 3, or as otherwise described herein. In one example, the one or more of the servers 135 may comprise an artificial intelligence (AI)/machine learning (ML)-based service platform (e.g., a network-based and/or cloud-based service hosted on the hardware of servers 135).

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of systems for providing an NTE detection service, as described herein. As just one example, DB(s) 136 may be configured to receive and store network operational data collected from the communication service provider network 150, such as call logs, message detail records (e.g., regarding SMS or MMS messages), control plane signaling and/or session management messages, and so forth (broadly "call detail records" (CDRs)), mobile device location data, subscriber roaming status information, traffic volume records, error reports, network impairment records, performance logs, alarm data, and other information and statistics, which may then be compiled and processed, e.g., normalized, transformed, tagged, etc., and forwarded to DB(s) 136, via one or more of the servers 135. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like.

In one example, DB 136 may also store various network event data associated with unique user endpoint identification. For example, an international mobile subscriber identity (IMSI) is a unique number associated with Global System for Mobile Communications (GSM) and Universal Mobile Telecommunications System (UMTS) network mobile phone users. In other words, the IMSI is a unique number identifying a GSM subscriber. When a mobile phone is affiliated, a temporary IMSI is allocated and used to identify the subscriber in future interactions with the mobile phone. The IMSI is stored in the Subscriber Identity Module (SIM) inside the mobile phone and is sent by the mobile phone anytime the carrier network is accessed, e.g., transmitted during initialization. The IMSI may be deemed to have two parts. The first part (e.g., the first five or six digits) identifies the GSM wireless carrier in a specific country with whom the subscriber holds an account. The second part is allocated by the wireless carrier to uniquely identify the subscriber. The IMSI is used to acquire the details of the mobile phone in the Home Location Register (HLR) or the Visitor Location Register (VLR). Furthermore, it should be noted that a Mobile Station International Subscriber Directory Number (MSISDN) is a number that uniquely identifies a subscription in a GSM communications or a UMTS mobile network. It is the mapping of the telephone number to the subscriber identity module in a mobile phone. In other words, the difference between the IMSI and MSISDN is that IMSI is used to identify a subscriber by the operator, while MSISDN is the number which is used for dialing. Thus, network event data may include identifier matching data (e.g., subscriber identifiers such as IMSIs and/or MSISDNs) associated with mobile telephone numbers. Namely, network event data may also include: device location data, which may include locations associated with the telephone number from different times (e.g., a current/most recently recorded location and a prior recorded location), and access point authentication data. Thus, the IMSI and/or MSISDN information of a mobile user endpoint device (e.g., a mobile phone) can be tracked to determine whether the mobile user endpoint device is currently registered with a particular carrier network ("on-net") or not registered with a particular carrier network ("off-net").

In one example, DB(s) 136 may be configured to receive and store records from customer, user, and/or subscriber interactions, e.g., with customer facing automated systems and/or personnel of a communication network service provider (e.g., the operator of communication service provider network 150). For instance, DB(s) 136 may maintain call logs and information relating to customer communications which may be handled by customer agents via one or more of the devices 131-134. For instance, the communications may comprise voice calls, online chats, text messages, emails, customer notifications (e.g., customer reported roaming information, e.g., a customer reporting the current wireless network that the customer's endpoint device is currently registered with, or the customer responding to a specific query made by a wireless carrier) etc., and may be received by customer agents at devices 131-134 from one or more of devices 111-113, 121-123, etc. The records may include the times of such communications, the start and end times and/or durations of such communications, the touchpoints traversed in a customer service flow, results of customer surveys following such communications, any items or services purchased, the number of communications from each user, the type(s) of device(s) from which such communications are initiated, the phone number(s), IP address(es), etc. associated with the customer communications, the issue or issues for which each communication was made, etc. Alternatively, or in addition, any one or more of devices 131-134 may comprise an interactive voice response system (IVR) system, a web server providing automated customer service functions to subscribers, etc. In such case, DB(s) 136 may similarly maintain records of customer, user, and/or subscriber interactions with such automated systems. The records may be of the same or a similar nature as any records that may be stored regarding communications that are handled by a live agent.

Similarly, any one or more of devices 131-134 may comprise a device deployed at a retail location that may service live/in-person customers. In such case, the one or more of devices 131-134 may generate records that may be forwarded and stored by DB(s) 136. The records may comprise purchase data, information entered by employees regarding inventory, customer interactions, surveys responses, the nature of customer visits, etc., coupons, promotions, or discounts utilized, and so forth. In this regard, any one or more of devices 111-113 or 121-123 may comprise a device deployed at a retail location that may service live/in-person customers and that may generate and forward customer interaction records to DB(s) 136. For instance, such a device (e.g., a "personnel device") may comprise a tablet computer in which a retail sales associate may input information regarding a customer and details of the transaction, such as identity and contact information provided by the customer (e.g., a name, phone number, email address, mailing address, etc.), desired items (e.g., physical items, such as smart phones, phone cases, routers, tablet computers, laptop computers, etc., or service items, such as a new subscription or a subscription renewal, a type of subscription (e.g., prepaid, non-prepaid, etc.), an agreement duration (e.g., a one-year contract, a two-year contract, etc.), add-on services (such as additional data allowances, international calling plans, and so forth), discounts to be applied (such as free phone upgrades and/or subsidized phone upgrades, special group discounts, etc.), and so on. In such case, information entered and/or obtained via such personnel devices may be forwarded to server(s) 135 and/or DB(s) 136 for processing and/or storage. As such, DB(s) 136, and/or server(s) 135 in conjunction with DB(s) 136, may comprise a retail inventory management knowledge base. In addition, DB(s) 136 and/or server(s) 135 in conjunction with DB(s) 136 may comprise an account management system. For instance, information regarding subscribers' online and in-store activities may also be included in subscriber account records (e.g., in addition to contact information, payment information, information on current subscriptions, authorized users, duration of contract, etc.).

In one example, DB(s) 136 may alternatively or additionally receive and store data from one or more third parties. For example, one or more of the endpoint devices 111-113 and/or 121-123 may represent a server, or servers, of a NTE detection entity (e.g., a third party company providing a service to a wireless carrier that determines whether a call is an NTE, etc.), a merchant, or the like. In such an example, DB(s) 136 may obtain one or more data sets/data feeds comprising information such as: subscriber roaming status information (e.g., subscriber wireless network registration information, time of registration, length of time of the registration, time of termination from registered wireless network, and the like) and so forth. In one example, one or more of endpoint devices 111-113 and/or 121-123 may represent a server, or servers, of an email service provider, from which DB(s) 136 may obtain email address service information (e.g., high-level information, such as the date that the email address was created and/or an age or approximate age of the email address since it was created, a mailing address and/or phone number (if any) that is associated with the email address (and if the third party is permitted to provide such information in accordance with the email address owner's permissions). Such information may then be leveraged in connection with email addresses that may be provided by customers during in-person transactions at communication network service provider retail locations. Similarly, one or more of the endpoint devices 111-113 and/or 121-123 may represent a server, or servers, of one or more merchants or other entities (such as entities providing ticketed sporting events and/or concerts, email mailing lists, etc.), from which DB(s) 136 may obtain additional email address information (e.g., email address utilization information). Such historical communication interactions (e.g., calls, texts, voicemails, emails, and the like) can be further assessed by an NTE detection service. For instance, if a phone number from wireless carrier A calls or texts someone on wireless carrier B from a wireless carrier A's domain 99.9% of the time, one can ascertain with a high level of confidence from the historical communication interactions that the phone number belongs to wireless carrier A.

In one example, DB(s) 136 may store subscriber roaming status information. For example, it is necessary to have a register or database that provides a listing of users who are allowed to register with a given network. With mobile endpoint devices potentially traversing over a very large geographical area serviced by a plurality of different wireless carriers, methods are implemented to ensure that the mobile endpoint devices registering with various wireless networks are tracked to ensure the subscriber accounts are valid and for billing purposes. To achieve this, the user information is checked to provide authentication and encryption parameters that will verify the user's identity and to ensure confidentiality.

More specifically, in one embodiment once registered onto a wireless network two registers are normally required. These are the home location register (HLR) and the visitors location register (VLR). These two registers are used to keep track of the mobile endpoint device so that the wireless network knows where the mobile endpoint is at any time so that calls or texts can be routed to the correct base station of the network. These registers are used to store the last known location of the mobile endpoint device. Thus, at registration the register is updated and then updated periodically afterward as the mobile endpoint device updates its position. Even when the mobile endpoint device is in an idle mode, the mobile endpoint device will periodically communicate with the wireless network to update its position and status. When the mobile endpoint device is switched off, it will send a detach message. This will inform the wireless network that the mobile endpoint device is switching off, and will enable the wireless network to update the last known position for the mobile endpoint device.

The two registers discussed above are provided where one register is for mobile endpoint devices for which the wireless network is the home wireless network, i.e., the one with whom contracts exist for the subscribers, and the other register is for visiting mobile endpoint devices (e.g., visitors who are not subscribers of the home network). In one embodiment, when the mobile endpoint device is roaming (e.g., in a new country), a message is sent back to the HLR when the mobile endpoint device first enters the new country indicating that the mobile endpoint device is registered with a different wireless network and that any calls and/or texts for that mobile endpoint device should be forwarded to the foreign visited wireless network. In this operational scenario, a wireless carrier A (e.g., communication service provider network 150) will have the roaming status information of its subscribers who are visiting a wireless network of wireless carrier B (e.g., communication service provider network 150n), wireless carrier C (e.g., another communication service provider network 150n) and so on. In other words, each wireless carrier will always know whether one of its subscribers is currently roaming and/or registered with a foreign wireless network (broadly subscriber roaming status information). This subscriber roaming status information can be used to implement an NTE detection service as discussed below.

In one example, DB(s) 136 may store various prediction models (e.g., AI/ML-based prediction models) for various tasks. For instance, one or more prediction models may be trained to determine/predict whether a wireless telephone number or device identifier is associated with an NTE (or not). For example, a first prediction model may be trained and configured to accept wireless telephone numbers as inputs, while a second prediction model may be trained and configured to accept device identifiers as inputs, while a third prediction model may be trained and configured to accept content of a text message or content of an audio message (e.g., the content can be evaluated to determine whether it may be associated with a robocall, if the subscriber consent is received to allow the analysis of such content), and so on. However, in another example, a prediction model may be trained and configured to accept multiple inputs (e.g., the wireless phone number, device identifier and message content may be used as inputs that may be applied to the NTE prediction model).

It should be noted that as referred to herein, a prediction model may include a machine learning model (MLM) (or machine learning-based model), e.g., a machine learning algorithm (MLA) that has been "trained" or configured in accordance with input data (e.g., training data) to perform a particular service, e.g., to detect/predict whether a wireless phone number, device identifier or message content is or is not associated with an NTE activity, to classify a risk/threat level of being associated with an NTE (e.g., high, medium, low risk), etc., to provide a fraud indicator, or value indicative of a likelihood of an NTE, and so forth. Examples of the present disclosure may incorporate various types of MLAs/models that utilize training data, such as support vector machines (SVMs), e.g., linear or non-linear binary classifiers, multi-class classifiers, deep learning algorithms/models, such as deep learning neural networks or deep neural networks (DNNs), generative adversarial networks (GANs), decision tree algorithms/models, k-nearest neighbor (KNN) clustering algorithms/models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. In one example, an NTE prediction model, or other MLMs of the present disclosure may be in accordance with a MLA/MLM from an open source library, such as OpenCV, which may be further enhanced with domain specific training data. In an illustrative example, an NTE prediction MLM of the present disclosure may comprise a gradient boosted machine (GBM).

In one example, DB(s) 136 may also store training data and/or testing data that may be used to train and verify the accuracy of a prediction model for NTE detection and/or NTE scoring/classification, and so forth (broadly, an "NTE prediction model") as described herein. For example, known NTE datasets can be used as training datasets for a prediction model. After training, this will allow a trained NTE prediction model to output a score that will reflect the probability of a call being an NTE.

Operations of server(s) 135 for applying a plurality of features extracted from a plurality of phone numbers, a plurality of device identifiers and/or a plurality of message content to a prediction model that is configured to output an NTE risk value of a first phone number, a first device identifier, or a first message content and/or server(s) 135 in conjunction with one or more other devices or systems (such as DB(s) 136), are further described below in connection with the examples of FIGS. 2 and 3. In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in communication service provider network 150, in communication service provider network 150*n*, and so forth.

In addition, it should be understood that other aspects of the system 100 may be omitted from illustration in FIG. 1. As just one example, the system 100 may include a data distribution platform such as Apache Kafka, or the like, for obtaining sets/streams of data from communication network service provider data source(s) (e.g., server(s) 155-155*n*, devices 131-134, or the like) and third party data source(s) (e.g., endpoint devices 111-113, endpoint devices 121-123, or the like). The system 100 may also incorporate in-stream processing, such as preprocessing of raw data for ingestion into a database (e.g., a relationship graph) stored by DB(s) 136 and/or for input into a prediction model via server(s) 135. For example, the server(s) 135 and/or DB(s) 136, as well as upstream data sources, may be deployed on one or more instances of Apache Flink, or the like, as part of and/or in association with the Kafka streaming platform. In addition, the prediction model(s), the NTE detection processes, and so forth may be trained within and/or may operate on such a platform. For instance, the server(s) 135 and/or DB(s) 136 may comprise an instance of Apache Spark, e.g., on top of Hive and Hadoop Distributed File System (HDFS), or similar arrangement. Thus, these and other aspects are all contemplated within the scope of the present disclosure.

Figure 2:
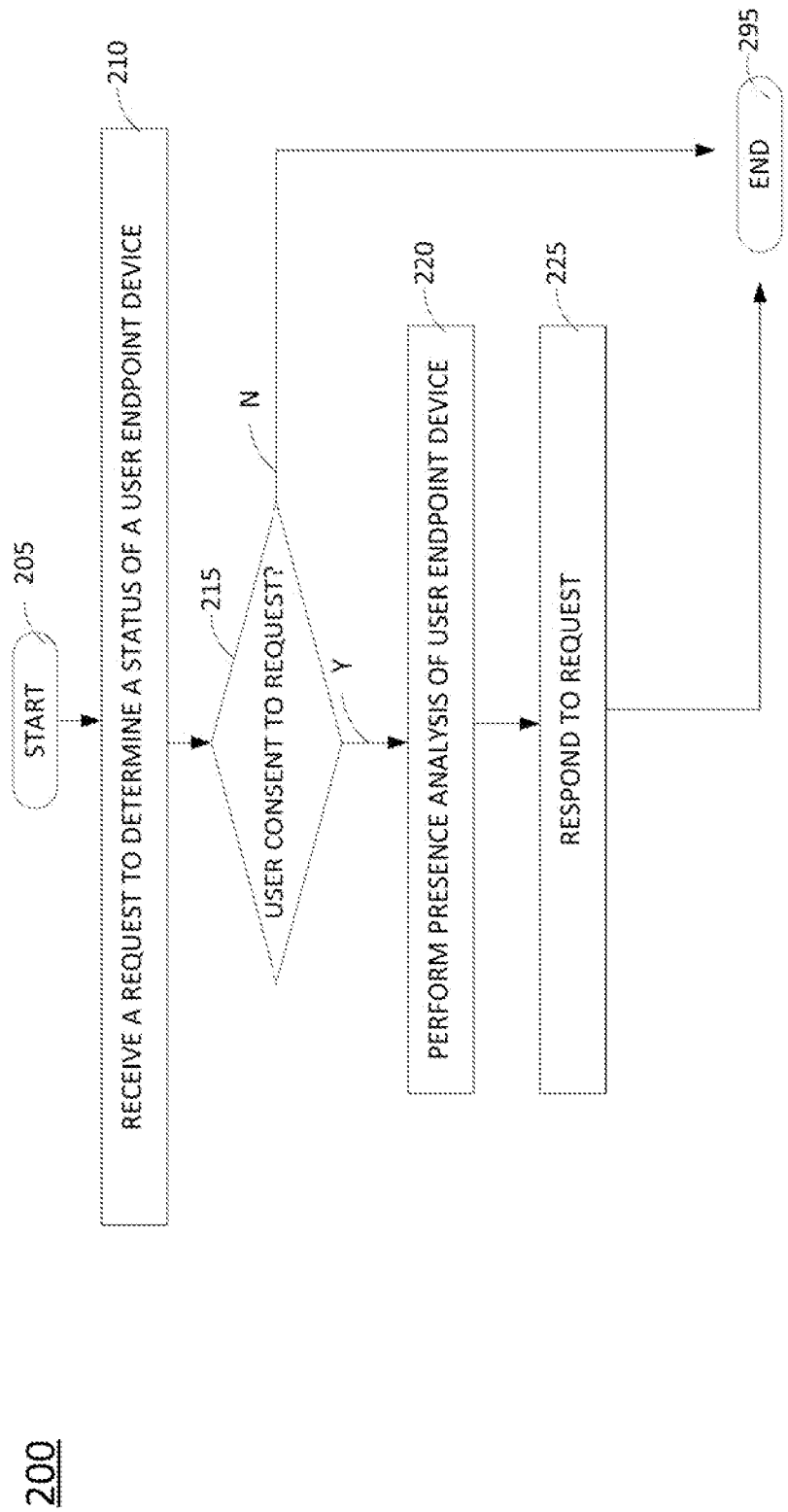
FIG. 2 illustrates a flowchart of an example method for detecting nuisance traffic events.

FIG. 2 illustrates an example flowchart of a method 200 for performing NTE detection. In one example, steps, functions, and/or operations of the method 200 may be performed by a device as illustrated in FIG. 1, e.g., one of servers 135. Alternatively, or in addition, the steps, functions and/or operations of the method 200 may be performed by a processing system collectively comprising a plurality of devices as illustrated in FIG. 1 such as one or more of server(s) 135, DB(s) 136, endpoint devices 111-113 and/or 121-123, devices 131-134, server(s) 155, and so forth. In one example, the steps, functions, or operations of method 200 may be performed by a computing device or processing system, such as computing system 400 and/or a hardware processor element 402 as described in connection with FIG. 4 below. For instance, the computing system 400 may represent at least a portion of a platform, a server, a system, and so forth, in accordance with the present disclosure. In one example, the steps, functions, or operations of method 200 may be performed by a processing system comprising a plurality of such computing devices as represented by the computing system 400. For illustrative purposes, the method 200 is described in greater detail below in connection with an example performed by a processing system. The method 200 begins in step 205 and proceeds to step 210.

At step 210, the processing system (e.g., of a wireless carrier network of a wireless carrier B), receives a request from an entity (e.g., from a wireless carrier A or a third party service provider) requesting a determination of the status of a user endpoint device relating to a wireless phone number. The status may comprise a determination as to a validity of a subject communication associated with the wireless phone number. For example, wireless carrier A may have received a subject communication (e.g., a call or a text message) terminating on wireless carrier A's network from a wireless phone number associated with a subscriber of wireless carrier B. The request from wireless carrier A may take different forms. In one embodiment, the request may contain a request for roaming status information of the user endpoint device associated with the number, e.g., is the wireless phone number currently registered with wireless carrier B's network or is the wireless phone number roaming outside of wireless carrier B's network, and/or if so, which foreign wireless carrier network. Since the request pertains to obtaining subscriber roaming information from another wireless carrier, in one embodiment the request also includes the purpose as to the specific use of the subscriber roaming information, e.g., for verification in an NTE detection service. In other words, the request may indicate that the request is being made in an attempt to determine whether the subject communication is a nuisance traffic event. In another embodiment, the request may simply contain a request for verification of the validity of a subject communication (e.g., a call or a text) initiating from the wireless phone number of a subscriber from wireless carrier B. In the first embodiment, subscriber roaming information is shared with another wireless carrier, whereas in the second embodiment no subscriber roaming information is shared with another wireless carrier. In one embodiment, step 210 can be deemed optional if the subscriber roaming information is provided passively, e.g., provided to another wireless carrier or third party service provider on a periodic basis under a contract without responding to a specific request.

In step 215, the processing system determines whether the user associated with the wireless phone number has provided his or her consent to the above request. The consent can be provided at different levels, e.g., 1) wireless carrier B may provide the requested subscriber roaming information, 2) wireless carrier B may provide the requested subscriber roaming information only pertaining to a specific service, e.g., an NTE detection service, or 3) wireless carrier B may not provide the requested subscriber roaming information, but is authorized to provide an answer (e.g., a "yes" response, a "no" response, or a confidence score between 1-100, and so on) as to the validity of the subject communication associated with the wireless phone number. If user consent is provided, then the user consent can be stored in a subscriber profile associated with the wireless phone number. If the query is answered positively, method 200 proceeds to step 220. If the query is answered negatively, method 200 proceeds to step 295.

In step 220, the processing system performs a presence analysis of the user endpoint device associated with the wireless phone number. For example, the processing system may determine whether the user endpoint device is currently registered with wireless carrier B's network or with another foreign carrier network. In one embodiment, the processing system may perform an additional step of arriving at a determination as to the validity of the subject communication associated with the wireless phone number. For example, if the request indicated that the wireless phone number originated from a wireless network or domain associated with wireless carrier B and the user endpoint device of the wireless phone number is currently registered with the wireless B's network, then the response to the request can be a positive response or a high confidence score. In another example, if the request indicated that the wireless phone number originated from a wireless network or domain associated with wireless carrier B and the user endpoint device of the wireless phone number is not currently registered with the wireless B's network or is currently registered with a foreign wireless network, then the response to the request can be a negative response or a low confidence score. In one embodiment, the performing can be performed with a prediction model, e.g., a machine learning model, for predicting a nuisance traffic event. The machine learning model can be trained with training data that takes into account other information in addition to network registration information associated with the wireless phone number, e.g., historical calling patterns, and the like.

In step 225, the processing system responds to the request. In one embodiment, subscriber roaming information is provided to another wireless carrier or an independent third party service provider. It should be noted that in one embodiment, the request may have originated from an independent third party (not another wireless carrier) who is providing an NTE detection service. Alternatively, the processing system may respond to the request by providing a validity verification (e.g., the subject communication is valid or invalid) or a confidence score (e.g., a high confidence score (e.g., a score of 90 out of 100 indicating probably "valid") or a low confidence score (e.g., a score of 5 out of 100 indicating probably "invalid")) instead without providing the actual subscriber roaming information. In one alternate embodiment, the responding step may optionally include providing the subscriber roaming information associated with the wireless phone number to the first entity, if user consent is determined to have been given. In step 295, method 200 ends.

Figure 3:
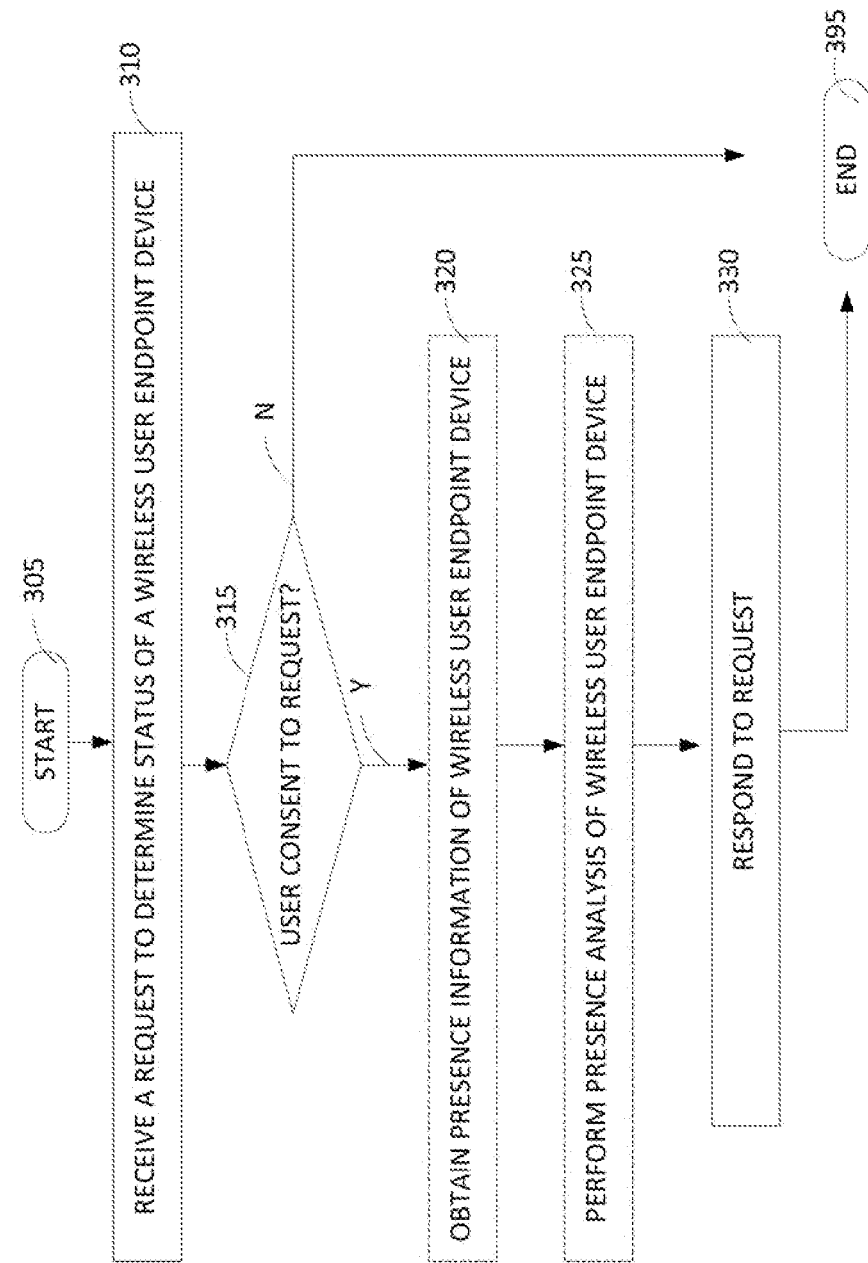
FIG. 3 illustrates a flowchart of another example method for detecting nuisance traffic events.

FIG. 3 illustrates another example flowchart of a method 300 for performing NTE detection. In one example, steps, functions, and/or operations of the method 300 may be performed by a device as illustrated in FIG. 1, e.g., one of servers 135. Alternatively, or in addition, the steps, functions and/or operations of the method 300 may be performed by a processing system collectively comprising a plurality of devices as illustrated in FIG. 1 such as one or more of server(s) 135, DB(s) 136, endpoint devices 111-113 and/or 121-123, devices 131-134, server(s) 155, and so forth. In one example, the steps, functions, or operations of method 300 may be performed by a computing device or processing system, such as computing system 400 and/or a hardware processor element 402 as described in connection with FIG. 4 below. For instance, the computing system 400 may represent at least a portion of a platform, a server, a system, and so forth, in accordance with the present disclosure. In one example, the steps, functions, or operations of method 300 may be performed by a processing system comprising a plurality of such computing devices as represented by the computing system 400. For illustrative purposes, the method 300 is described in greater detail below in connection with an example performed by a processing system. The method 300 begins in step 305 and proceeds to step 310.

At step 310, the processing system (e.g., of a wireless user endpoint device), receives a request from a first entity (e.g., from a wireless carrier A or a third party service provider) requesting a determination of the status of the wireless user endpoint device relating to its network registration. For example, the status comprises a determination as to a validity of a subject communication associated with the wireless phone number. For example, wireless carrier A may have received a call terminating on wireless carrier A's network from a wireless phone number associated with the wireless user endpoint device. Wireless carrier A may or may not be the subscriber's own contracted or home wireless carrier. Again, the request from wireless carrier A may take different forms. In one embodiment, the request may contain a request for roaming status information of the wireless user endpoint device associated with the number, e.g., which wireless network is the wireless phone number currently registered with or is the wireless phone number roaming outside of subscriber's home carrier network, and/ or if so, which foreign wireless carrier network. Since the request pertains to obtaining subscriber roaming information from another wireless carrier, in one embodiment the request also includes the purpose as to the specific use of the subscriber roaming information, e.g., for verification in an NTE detection service. In another embodiment, the request may simply contain a request for verification of the validity of a subject communication (e.g., a call or a text) initiating from the wireless phone number. In the first embodiment, subscriber roaming information is shared with another wireless carrier, whereas in the second embodiment no subscriber roaming information is shared with another wireless carrier. In one embodiment, step 310 can be deemed optional if the subscriber roaming information is provided passively, e.g., provided to another wireless carrier or third party service provider on a periodic basis under a contract without responding to a specific request.

In step 315, the processing system determines whether the user associated with the wireless phone number has provided his or her consent to the above request, e.g., in a configuration file located on the wireless user endpoint device. The consent can be provided at different levels, e.g., 1) wireless user endpoint device may provide the requested subscriber roaming information, 2) wireless user endpoint device may provide the requested subscriber roaming information only pertaining to a specific service, e.g., an NTE detection service, or 3) wireless user endpoint device may not provide the requested subscriber roaming information, but is authorized to provide an answer (e.g., a "yes" response, a "no" response, or a confidence score between 1-100, and so on) as to the validity of the subject communication associated with the wireless phone number. If the query is answered positively, method 300 proceeds to step 320. If the query is answered negatively, method 300 proceeds to step 395.

In optional step 320, the processing system obtains presence information of the wireless user endpoint device. For example, the processing system may determine whether the wireless user endpoint device is currently registered with its home wireless carrier network or with another foreign carrier network.

Specifically, a wireless user endpoint device is aware of the wireless network on which it is registered and whether the registration wireless network is its home wireless network. Wireless user endpoint devices can then use this functionality to send the current network registration information or alternatively a simple "on-network" or "off network" flag to a database or to a requesting wireless carrier. For example, the database may be either resident within a wireless carrier's network or at an independent location with access from a plurality of wireless carriers. A wireless carrier can then be informed of the roaming status of any wireless user endpoint device having such information in the database with information supplied directly by the wireless user endpoint devices. For example, assume a wireless carrier A's mobile device sends information to a processing center that builds the mobile device roaming status database. The minimal information would be that the mobile device is "on" or "off" of its home network of wireless carrier A. Assume the mobile device is not roaming, so its status indicator would be "Not Roaming." Then, carrier B received a call request from the same carrier A wireless phone number, but it arrives from a network domain of wireless carrier C instead of wireless carrier A. Carrier B would then be able to detect this difference in real time and block the incoming call because the incoming call should only be arriving from wireless carrier A's network or domain when not roaming.

To account for the fact that mobile devices may sometimes change home networks, a facilitation for the processing system would be for the mobile device to report its home network ID. In so doing, carrier B would know not only whether the mobile device is roaming from its home network, but also what that home network is. The service that creates the database from mobile device inputs could also send database updates directly to the wireless carrier networks as a subscription service or be queryable on an individual request basis from those wireless carrier networks. It has been observed that the large majority of mobile devices do not roam very often and even when they do, network registration remains static for long periods of time. This means that updates to the database information will be considered relatively low bandwidth data.

In the embodiment where the mobile-supplied information provides the actual network registration information as opposed to just a roaming flag, any wireless carrier can compare such information to call request information such as the routing path over which the call arrives in order to detect robocalling. For instance, a carrier A mobile device may be roaming on a wireless carrier B's network located in Mexico. By knowing the registration is in Mexico as opposed to just knowing the mobile device is roaming somewhere, an incoming call request from the same wireless phone number from Costa Rica can be detected as a spoofed call. The mobile device cannot be simultaneously registered in Mexico and Costa Rica.

In optional step 330, the processing system performs a presence analysis of the wireless user endpoint device. It should be noted that the above step 320 can be deemed a sub-step of step 330. In one embodiment, the processing system may perform the step of arriving at a determination as to the validity of the subject communication associated with the wireless phone number. For example, if the request indicated that the wireless phone number originated from a wireless network or domain associated with wireless carrier B and the wireless user endpoint device of the wireless phone number is currently registered with the wireless B's network, then the response to the request can be a positive response or a high confidence score. In another example, if the request indicated that the wireless phone number originated from a wireless network or domain associated with wireless carrier B and the wireless user endpoint device of the wireless phone number is not currently registered with the wireless B's network or is currently registered with a foreign wireless network, then the response to the request can be a negative response or a low confidence score.

In step 330, the processing system responds to the request. In one embodiment, subscriber roaming information is provided to another wireless carrier or an independent third party service provider. It should be noted that in one embodiment, the request may have originated from an independent third party (not another carrier) who is providing an NTE detection service. Alternatively, the processing system may respond to the request by providing a validity verification or a confidence score instead without providing the actual subscriber roaming information. In other word, the processing system responds to the request by providing an indication as to the validity of the subject communication associated with the wireless phone number back to the requesting entity. In step 395, method 300 ends.

It should be noted that methods 200 and 300 may be expanded to include additional steps, or may be modified to replace steps with different steps, to combine steps, to omit steps, to perform steps in a different order, and so forth. For instance, in one example, the processing system may repeat one or more steps of the methods 200 and 300, such as steps 210-25, or steps 310-330, for additional wireless phone number and/or device identifiers, and so forth. In one example, the methods 200 and 300 may include training the NTE prediction model in accordance with a training data set (e.g., groups/sets of input factors for wireless phone numbers or calls for which labels have been applied). In one example, the methods 200 and 300 may include retraining the NTE prediction model, e.g., when a detected accuracy falls below a threshold accuracy, when the detected accuracy declines a certain percentage below an expected accuracy when the NTE prediction model was deployed, etc. Thus, these and other modifications are all contemplated within the scope of the present disclosure.

In addition, although not specifically specified, one or more steps, functions, or operations of the methods 200 and 300 may include a storing, displaying, and/or outputting step as required for a particular application. In other words, any data, records, fields, and/or intermediate results discussed in the methods 200 and 300 can be stored, displayed and/or outputted either on the device(s) executing the methods 200 and 300, or to another device or devices, as required for a particular application. Furthermore, steps, blocks, functions, or operations in FIGS. 2-3 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 200 and 300 may comprise optional steps, or can be combined, separated, and/or performed in a different order from that described above, without departing from the examples of the present disclosure.

Figure 4:
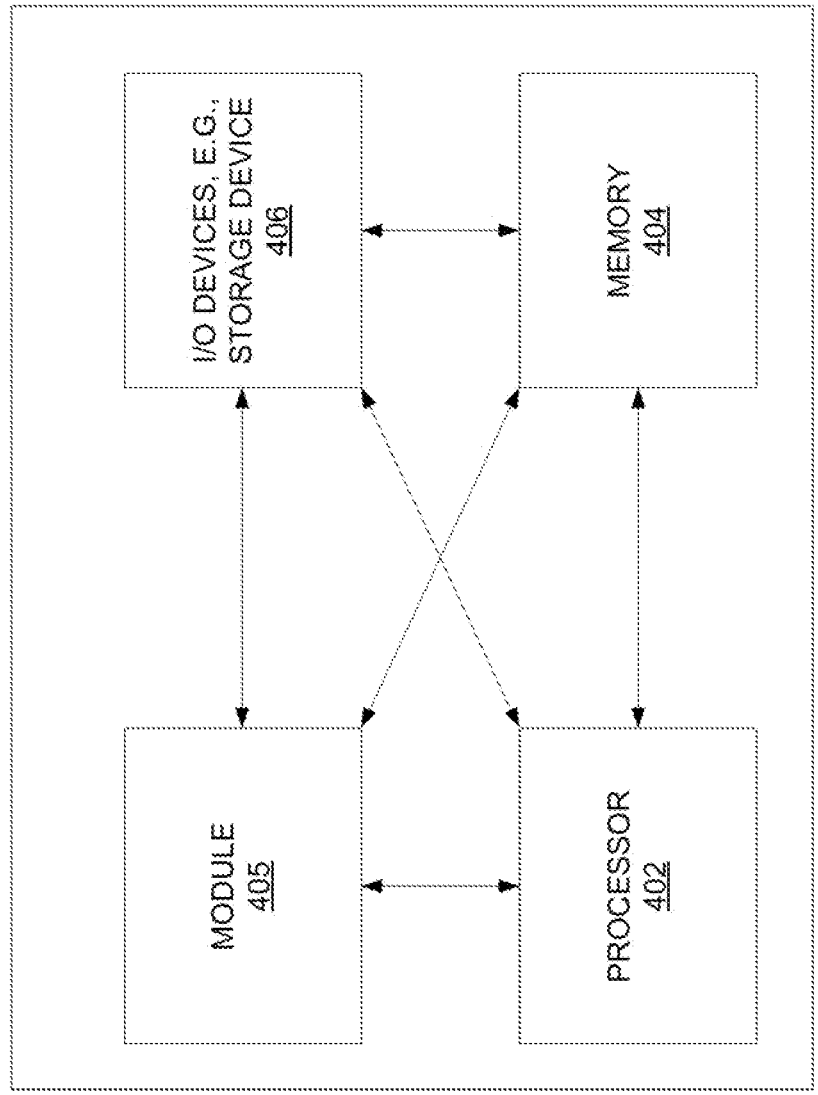
FIG. 4 illustrates a high-level block diagram of a computing device specially programmed to perform the functions described herein.

FIG. 4 depicts a high-level block diagram of a computing system 400 (e.g., a computing device, or processing system) specifically programmed to perform the functions described herein. For example, any one or more components or devices illustrated in FIG. 1, or described in connection with the examples of FIGS. 2 and 3 may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where hardware processor element may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for providing an NTE detection service, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, it should be noted that the computing device may employ a plurality of hardware processor elements. Furthermore, although only one computing device is shown in FIG. 4, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 4 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing an NTE detection service (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing an NTE detection service (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
receiving from a first entity, by a processing system including at least one processor of a second wireless carrier network, a request to determine a status of a wireless user endpoint device associated with a wireless phone number, wherein the status comprises a determination as to a validity of a subject communication associated with the wireless phone number;
determining, by the processing system, that a user consent has been received to allow the processing system to respond to the request;
performing, by the processing system, a presence analysis of the wireless user endpoint device based on the wireless phone number; and
responding, by the processing system, to the request by providing an indication as to the validity of the subject communication associated with the wireless phone number back to the first entity.

2. The method of claim 1, wherein the indication comprises at least one of: the subject communication is valid or the subject communication is invalid.

3. The method of claim 1, wherein the indication comprises a confidence score indicating at least one of: the subject communication is valid or the subject communication is invalid.

4. The method of claim 1, wherein the responding does not provide roaming information associated with the wireless phone number.

5. The method of claim 4, wherein the wireless phone number is associated with a subscriber of the second wireless carrier network.

6. The method of claim 1, wherein the first entity comprises a first wireless carrier network.

7. The method of claim 1, wherein the first entity comprises a third party service provider that does not operate a wireless carrier network.

8. The method of claim 7, wherein the third party service provider provides a nuisance traffic event detection service.

9. The method of claim 8, wherein the nuisance traffic event detection service comprises a service to detect whether the subject communication is at least one of: a robocall or a robotext.

10. The method of claim 1, wherein the performing utilizes at least one of: an international mobile subscriber identity or a mobile station international subscriber directory number associated with the wireless phone number.

11. The method of claim 1, wherein the request indicates that the request is being made in an attempt to determine whether the subject communication is a nuisance traffic event.

12. The method of claim 1, wherein the user consent is stored in a subscriber profile associated with the wireless phone number.

13. The method of claim 1, wherein the responding includes providing roaming information associated with the wireless phone number to the first entity.

14. The method of claim 1, wherein the performing comprises determining whether the wireless phone number is currently registered with the second wireless carrier network.

15. The method of claim 13, wherein the performing further comprises determining whether the wireless phone number is currently registered with another wireless carrier network if the wireless phone number is not currently registered with the second wireless carrier network.

16. The method of claim 1, wherein the performing is performed with a prediction model for predicting a nuisance traffic event.

17. The method of claim 16, wherein the prediction model comprises a machine learning model.

18. A non-transitory computer-readable medium storing instructions which, when executed by a processing system including at least one processor of a second wireless carrier network, cause the processing system to perform operations, the operations comprising:

receiving from a first entity a request to determine a status of a wireless user endpoint device associated with a wireless phone number, wherein the status comprises a determination as to a validity of a subject communication associated with the wireless phone number;

determining that a user consent has been received to allow the processing system to respond to the request;

performing a presence analysis of the wireless user endpoint device based on the wireless phone number; and responding to the request by providing an indication as to the validity of the subject communication associated with the wireless phone number back to the first entity.

19. An apparatus comprising:

a processing system including at least one processor of a second wireless carrier network; and a non-transitory computer-readable medium storing instructions which, when executed by the processing system, cause the processing system to perform operations, the operations comprising:

receiving from a first entity a request to determine a status of a wireless user endpoint device associated with a wireless phone number, wherein the status comprises a determination as to a validity of a subject communication associated with the wireless phone number;

determining that a user consent has been received to allow the processing system to respond to the request;

performing a presence analysis of the wireless user endpoint device based on the wireless phone number; and responding to the request by providing an indication as to the validity of the subject communication associated with the wireless phone number back to the first entity.

20. The apparatus of claim 19, wherein the indication comprises at least one of: the subject communication is valid or the subject communication is invalid.

* * * * *